United States Patent [19]

Miyake

[11] Patent Number: 5,459,490
[45] Date of Patent: Oct. 17, 1995

[54] IMAGE PROCESSING APPARATUS

[75] Inventor: Shigeru Miyake, Kobe, Japan

[73] Assignee: Ricoh Company, Ltd., Tokyo, Japan

[21] Appl. No.: 80,181

[22] Filed: Jun. 23, 1993

Related U.S. Application Data

[63] Continuation-in-part of Ser. No. 896,763, Jun. 10, 1992, abandoned, which is a continuation-in-part of Ser. No. 456,929, Dec. 22, 1989, abandoned.

[30] Foreign Application Priority Data

Dec. 28, 1988 [JP] Japan .................................. 63-332561

[51] Int. Cl.$^6$ .................................................... G09G 1/02
[52] U.S. Cl. ........................................... 345/185; 382/293
[58] Field of Search ............... 382/44, 46; 345/126–131, 345/185

[56] References Cited

U.S. PATENT DOCUMENTS 4,477,802 10/1984 Walter et al. .
4,593,407 6/1993 Konishi et al. .
4,970,682 11/1990 Beckwith, Jr. et al. .

OTHER PUBLICATIONS

Artwick, B. A., *Microcomputer Displays, Graphics, and Animation*, Prentice–Hall, Inc., Englewood Cliffs, N.J., Second Edition, 1985, pp. 75–80.

Primary Examiner—Ulysses Weldon
Attorney, Agent, or Firm—Popham, Haik, Schnobrich & Kaufman, Ltd.

[57] ABSTRACT

An image processing apparatus especially suitable for image processing operations such as enlarging, reducing, rotating and scrolling avoids use of a second video memory. The image processing device comprises a memory having memory elements for storing picture element data of a video information which describes an original image, an operation circuit for receiving a start address where a read operation is to start within the memory and a predetermined data indicative of a difference between the start address and a next address where the read operation is to be made, and for calculating the next address from the start address data and the predetermined data, a reading circuit for reading the picture element data which is stored in the memory at the next address calculated by the operation circuit, and an output circuit for outputting the picture element data read by the reading circuit. The picture element data output from the output circuit describe at least a portion of the original image subjected to a predetermined image processing operation.

3 Claims, 8 Drawing Sheets

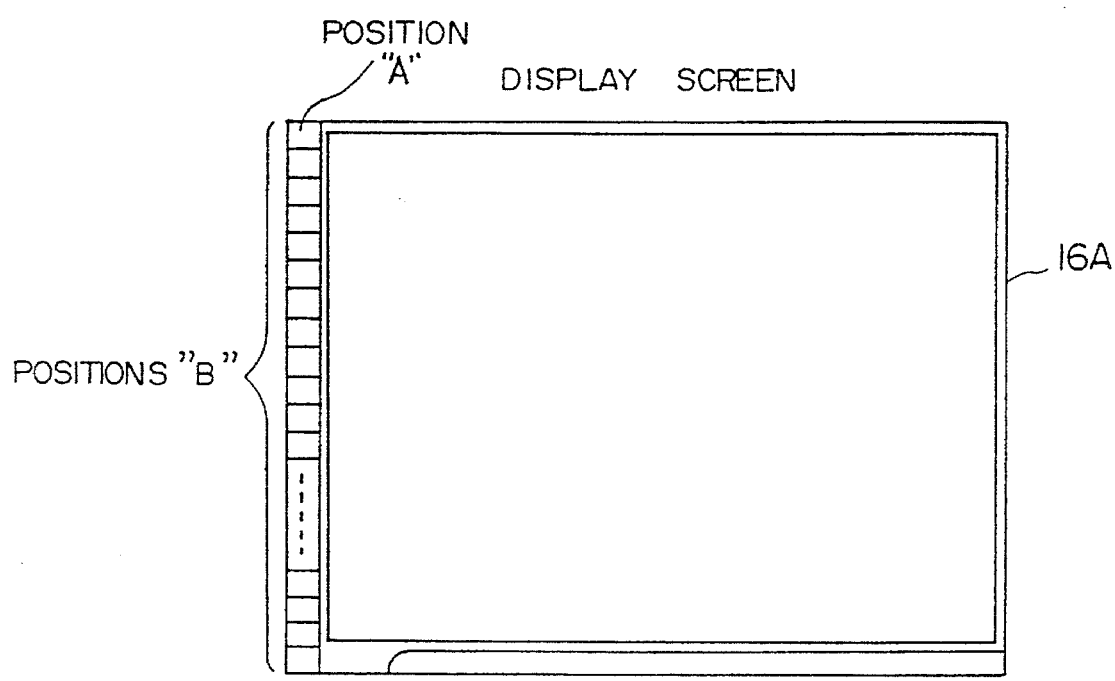

FIG. 4

| INPUT | | | OUTPUT | | | |
|---|---|---|---|---|---|---|
| | POSITION ON SCREEN 16A | TIMING IN FIG.5 | DATA OUTPUT FROM B-PORT 12e (REGISTER SELECTION SIGNAL) | DATA OUTPUT FROM A-PORT 12d (REGISTER SELECTION SIGNAL) | DESTINATION OF INPUT DATA (REGISTER SELECTION SIGNAL) | RELATION TO FORMULA (A3) |
| BOTH V-SYNC & H-SYNC ACTIVE | "A" | t1 | "0" (OUTPUT=0) | 12a $\begin{pmatrix} STX \\ STY \end{pmatrix}$ | 12g $\begin{pmatrix} CX_V \\ CY_V \end{pmatrix}$ | $X'_0 = x_0$ $Y'_0 = y_0$ |
| ONLY H-SYNC ACTIVE | "B" | t2 | 12c $\begin{pmatrix} \Delta X_V \\ \Delta Y_V \end{pmatrix}$ | 12g $\begin{pmatrix} CX_V \\ CY_V \end{pmatrix}$ | 12g $\begin{pmatrix} CX_V \\ CY_V \end{pmatrix}$ | $X'_n = X'_{n-1} + \Delta X_V$ $Y'_n = Y'_{n-1} + \Delta Y_V$ |
| AFTER ACTIVE H-SYNC | RIGHT ADJACENT TO "A" OR "B" | t3 | 12b $\begin{pmatrix} \Delta X_H \\ \Delta Y_H \end{pmatrix}$ | 12g $\begin{pmatrix} CX_V \\ CY_V \end{pmatrix}$ | 12f $\begin{pmatrix} CX_H \\ CY_H \end{pmatrix}$ | $X_n = X'_n,$ $Y_n = Y'_n$ |
| OTHER | OTHER | t4 | 12b $\begin{pmatrix} \Delta X_H \\ \Delta Y_H \end{pmatrix}$ | 12f $\begin{pmatrix} CX_H \\ CY_H \end{pmatrix}$ | 12f $\begin{pmatrix} CX_H \\ CY_H \end{pmatrix}$ | $X_n = X_{n-1} + \Delta X_H$ $Y_n = Y_{n-1} + \Delta Y_H$ |

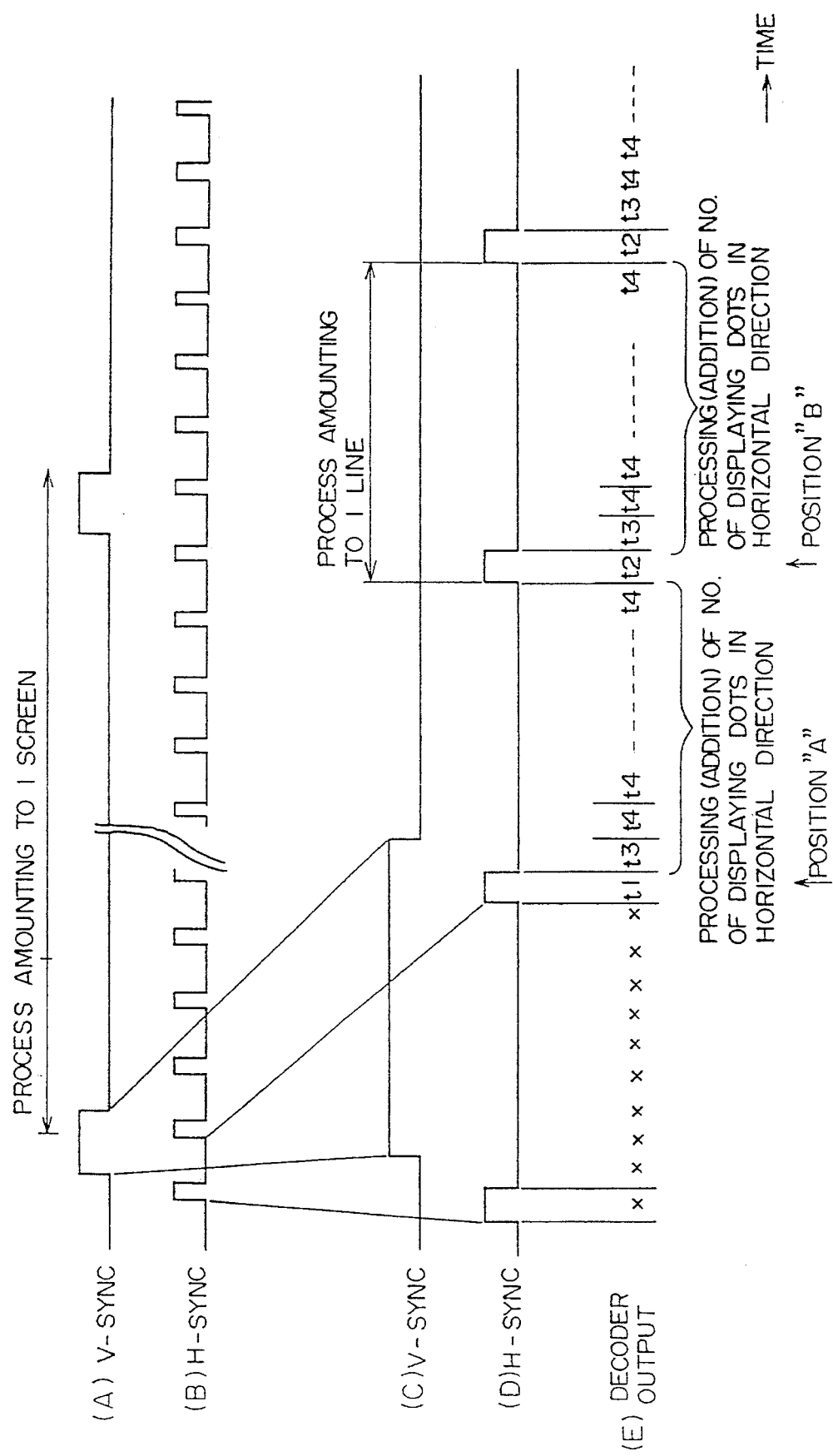

IMAGE PROCESSING APPARATUS

The present patent application is a continuation-in-part (CIP) patent application of U.S. patent application Ser. No. 07/896,763, filed Jun. 10, 1992, which is in turn a continuation-in-part (CIP) patent application of Ser. No. 07/456,929, filed Dec. 22, 1989, both of which are incorporated herein by reference as if reproduced in full below.

BACKGROUND OF THE INVENTION

1. Field of the Invention

The present invention generally relates to image processing apparatuses, and more particularly to an image processing apparatus that performs image processing operations such as enlarging, reducing and rotating an image when displaying a video data which is stored in a video memory.

2. Related Art

When displaying an image information which is supplied from an image pickup device or the like after subjecting the video information to an image processing such as enlarging, reducing, rotating and scrolling, the video information is first supplied to an independent image processing circuit for making one kind of image processing. The processed video information is then displayed on a cathode ray tube (CRT), for example.

FIG. 1 shows an essential part of a conventional image processing apparatus for explaining an image processing. It will be assumed for the sake of convenience that the video information is to be rotated by the image processing. In FIG. 1, an A-address generating circuit 2 supplies an address signal to an A-video memory 3 and an B-address generating circuit 4 in response to a signal which is received from a bus 1 of a central processing unit (CPU, not shown). The A-video memory 3 stores video information which is received from an image pickup device (not shown) depending on the address signal from the A-address generating circuit 2. The B-address generating circuit 4 carries out multiplication and addition described by the following set of formulas (1) based on the address signal from the A-address generating circuit 2, and supplies to a B-video memory 5 an address signal indicating a coordinate value of the rotated video information:

$$X = \cos\theta \cdot x_o - \sin\theta \cdot y_o, \quad Y = \sin\theta \cdot x_o + \cos\theta \cdot y_o \qquad (1)$$

where $x_o$ and $y_o$ respectively denote address values output from the A-address generating circuit 2, and X and Y respectively denote address values output from the B-address generating circuit 4.

The B-video memory 5 stores the video information from the A-video memory 3 depending on the address signal which is received from the B-address generating circuit 4. The video information stored in the B-video memory 5 is supplied to a display device 6 which is provided with a CRT, for example.

Therefore, the video information from the image pickup device is temporarily stored in the A-video memory 3, and the B-video memory 5 stores the video information depending on the address signal from the B-address generating circuit 4 so that a rotated image can be displayed on the display device 6. In other words, by making a raster scan in which the stored video information is read out from the B-video memory 5 in a sequence of the address, and a display screen of the display device 6 is scanned horizontally in synchronism with the read out operation, an image which is rotated from the original image is displayed on the display device 6.

When performing image processing operations such as enlarging, reducing and rotating on conventional image processing apparatus, two video memories are required. That is, in the above-described case, the A-video memory 3 for storing the image information from the image pickup device, and the B-video memory 5 for storing the processed image information, which is obtained by processing the video information stored in the A-video memory 3, are required for the rotating process. For this reason, there is the problem that it takes a relatively long time to display the processed video information and so that the video information cannot be processed in real time.

In addition, when making the rotating process, the B-address generating circuit 4 requires a multiplier for carrying out the operation described by the set of formulas (1). This means that a high-speed operation circuit having an extremely large scale must be provided to carry out the operation in the B-address generating circuit 4. As a result, the image processing apparatus becomes quite expensive.

SUMMARY OF THE INVENTION

Accordingly, it is a general object of the present invention to provide a novel and useful image processing apparatus in which the above described problems are overcome.

Another and more specific object of the present invention is to provide an image processing apparatus comprising memory having memory elements for storing picture element data of a video information which describes an original image, each of the memory elements having an address assigned thereto, an operation portion for receiving a start address where a read operation is to start within the memory and a predetermined data indicative of a difference between the start address and a next address where the read operation is to be made, and for calculating the next address from the start address data and the predetermined data, reading portion coupled to the memory and the operation portion for reading the picture element data which is stored in the memory at the next address calculated by the operation portion, and output portion for outputting the picture element data read by the reading portion, where the picture element data output from the output describe at least a portion of the original image subjected to a predetermined image processing. According to the image processing apparatus of the present invention, it is only necessary to use one video memory for storing the video information when making an image processing such as rotating, enlarging, reducing and scrolling processes. In addition, the kind of image processing is selectable by merely setting the predetermined data in accordance with the desired image processing, and no complex operation such as multiplication is required to make the image processing. Therefore, the time required to make the image processing is short compared to the conventional case, and an inexpensive image processing apparatus can be realized.

A further aspect of the invention is to provide for conversion of a first order mapping Formula (A1) into a recurrence Formula (A2), and for transforming Formula (A2) into a Formula (A3) by taking into account:

(i) the characteristic of the raster scan display, (ii) the simplicity of the circuit, (iii) the ease with which the parameters may be set, and (iv) the degree of freedom of description of the display.

In particular the formulas (A1), (A2) and (A3) are as follows:

$$X = x_0 + A\cos\theta \cdot h - A\sin\theta \cdot v \\ Y = y_0 + A\sin\theta \cdot h + A\cos\theta \cdot v \quad\quad (A1)$$

where

X and Y denote coordinates on the memory, h and v denote coordinates on the display screen, A denotes reduction factor, θ denotes rotation angle, and $x_o$ and $y_o$ denote the amount of a parallel movement.

$$X_0 = x_0 \quad X_n = X_{n-1} + A\cos\theta \cdot \Delta v - A\sin\theta \cdot h \\ Y_0 = y_0 \quad Y_n = Y_{n-1} + A\sin\theta \cdot \Delta v + A\cos\theta \cdot h \quad\quad (A2)$$

where n=1, 2, . . .
Finally, $$\begin{aligned} X_0 &= X'_0 = x_0 \\ X_n &= X'_n = X'_{n-1} + \Delta X_v & \text{when } v \text{ changes} \\ X_n &= X_n + \Delta X_h & \text{when } h \text{ changes} \\ Y_0 &= Y'_0 = y_0 \\ Y_n &= Y'_n = Y'_{n-1} + \Delta Y_v & \text{when } v \text{ changes} \\ Y_n &= Y_n + \Delta Y_h & \text{when } h \text{ changes} \end{aligned} \quad (A3)$$

A central feature of this aspect of the present invention lies in the fact that Formula (A3) is carried out by a circuit. That is, a circuit implements Formula (A3). According to this aspect of the present invention, $x_o$, $y_o$, $\Delta X_v$, $\Delta Y_v$, $\Delta X_h$, and $\Delta Y_h$ are each independent variables. In other words, $x_o$, $Y_o$, $\Delta X_v$, $\Delta Y_v$, $\Delta X_h$, and $\Delta Y_h$ are not necessarily a function of the reduction factor A and the rotation angle θ. As a result, the present invention is able to provide displays with large degrees of freedom, such as those providing scrolling and slopes.

The invention thus provides an image processing apparatus having a memory having memory elements for storing picture element data of a video information which describes an original image, each of the memory elements having an address assigned thereto, as well as an operation part for receiving a start address where a read operation is to start within the memory and predetermined data indicative of a difference between the start address and a next address where the read operation is to be made and for calculating the next address from the start address data and the predetermined data. The image processing apparatus also has a reading part coupled to the memory and the operation part for reading the picture element data which is stored in the memory at the next address calculated by the operation part. The image processing apparatus also has an output part for outputting the picture element data read by the reading part, the picture element data output describing at least a portion of the original image subjected to a predetermined image processing. In the image processing apparatus, the start address includes a start address STX in a direction X and a start address STY in a direction Y. The predetermined data includes (1) a datum $\Delta X_H$ which indicates a difference between the start address data STX and a next address in the direction X when a scan is made on the display in a horizontal direction for the first minimum unit width; (2) a datum $\Delta Y_H$ which indicates a difference between the start address data STY and a next address in the direction Y when a scan is made on the display in the horizontal direction of the first minimum unit width; (3) a datum $\Delta X_V$ which indicates a difference between the start address data STX and a next address in the direction X when a scan is made on the display in a vertical direction for a second minimum unit width; and (4) a datum $\Delta Y_V$ which indicates a difference between the start address data STY and a next address in the direction Y when a scan is made on the display in the vertical direction for the second minimum unit width. Also, the operation part includes (1) a register for storing STX, STY, $\Delta X_H$, $\Delta Y_H$, $\Delta X_V$ and $\Delta Y_V$; (2) a register for storing sum data $CX_v$, $CY_v$, $CX_H$ and $CY_H$ wherein $CX_H$ and $CY_H$ in the register indicate the read address of the memory; and (3) an adder for adding the data received from the register and for supplying the sum data. The adder adds the data $\Delta X_H$ to $CH_H$ and $\Delta Y_H$ to $CY_H$ by every horizontal unit proceeding and adding the data $\Delta X_V$ to $CX_v$ and $\Delta Y_v$ to $CY_v$ to load the data from $CX_v$ to $CX_H$ and from $CY_v$ to $CY_H$ by every vertical unit proceeding. Here, H and V indicate coordinate axes on the display, and X and Y represent coordinate axes in the memory.

Another object of the present invention is to provide an image processing apparatus having a combination of the following elements. The apparatus has a memory for storing a video signal at addresses determined by an address signal, and a first control portion, coupled to the memory, for controlling write and read operations of the memory. The apparatus is also provided with a display which is coupled to the memory, the display having a display screen for displaying the video signal read from the memory by making successive horizontal scans in a vertical direction, based on synchronizing signals. The apparatus has a register having first through fifth storage parts. The first storage part is for storing a start address datum which indicates a start address STX in a direction X and a start address STY in a direction Y where a read operation from the memory starts. The second storage part is for storing a read rate datum which indicates a difference $\Delta X_H$ between the start address STX and a next address in the direction X and a difference $\Delta Y_H$ between the start address STY and a next address in the direction Y when a scan is made on the display screen in a horizontal direction for a first minimum unit width. The third storage part is for storing a read rate datum which indicates a difference $\Delta X_v$ between the start address STX and a next address in the direction X and a difference $\Delta Y_v$ between the start address STY and a next address in the direction Y when a scan is made on the display screen in the vertical direction for a second minimum unit width. The fourth and fifth storage parts are for storing sum data $CX_H$, $CY_H$, $CX_V$ and $CY_V$. The apparatus has only a single adder, which adder is coupled to the register, for adding first and second outputs of the register and for outputting sum data. The apparatus also has a multiplexer having at least a first input, the multiplexer being coupled to the register and the adder for feeding back the sum data from the adder to the register via the first input of the multiplexer. The second output of the register is supplied to the memory as the address signal. Finally, the apparatus has a second control portion, coupled to the register, for controlling input and output of the register by selection signals generated based on the synchronizing signals. In the apparatus, the selection signals determine the one of the first through fifth storage parts to which the fed back sum data from the adder are stored via the multiplexer, and the selection signals determine the two of the first through fifth storage parts from which the data are to be supplied to the adder as the first and second outputs, so that the display displays an image subjected to a predetermined process relative to an original image of the video signal. The predetermined process is selected from a group consisting of enlarging, reducing, rotating and scrolling. According to the present invention, it is possible to carry out the predetermined process on the video signal and display the processed image using a simple circuit which requires only one adder. Processing time is also reduced because of the relatively simple operation carried out by the adder.

Other objects and further features of the present invention will be apparent from the following detailed description when read in conjunction with the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 3 is a diagram for explaining display positions on a display screen;

FIG. 4 shows an embodiment of a table for explaining a decoding process of decoder 25 shown in FIG. 2;

FIG. 5 is a timing diagram explaining operation of the decoder;

FIG. 8 is a diagram for explaining a display position of stored video data on a display screen;

FIG. 9 is a diagram for explaining picture element data stored in the video memory;

FIG. 10 is a diagram for explaining a display position of the picture element data which is subjected to an enlarging process.

DETAILED DESCRIPTION OF THE PREFERRED EMBODIMENTS

Figure 2:
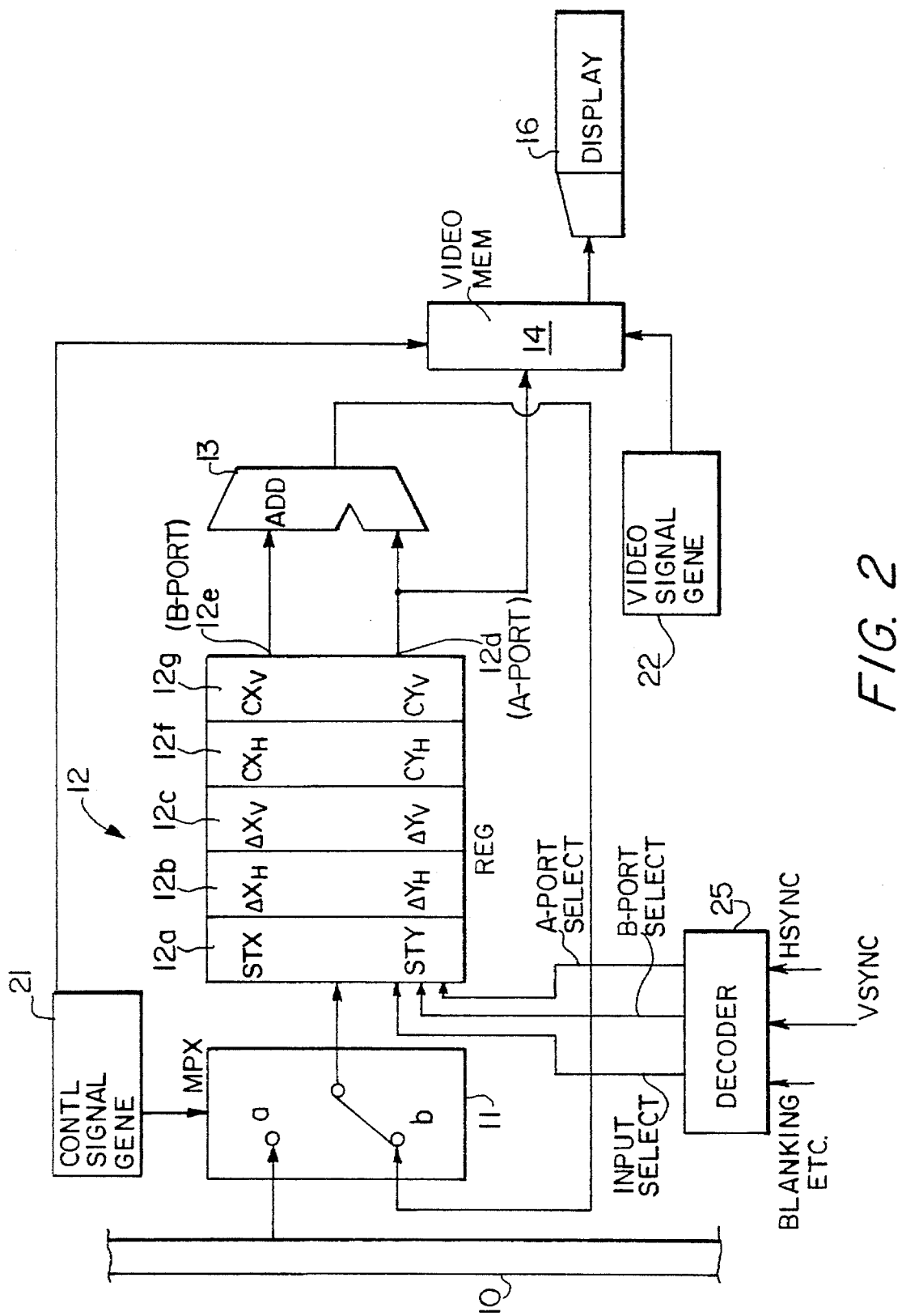
FIG. 2 is a system block diagram showing an essential part of an embodiment of an image processing apparatus according to the present invention.

FIG. 2 shows an essential part of an embodiment of an image processing apparatus according to the present invention. A multiplexer 11 is switched between contacts a and b in response to a control signal which is received from a control signal generator 21. The contact a is connected to a data bus 10 and the contact b is connected to an output of a full adder 13 which will be described later. For example, the control signal generator 21 may be a part of a control circuit (not shown) which controls the general operation of the image processing apparatus.

When the multiplexer 11 is connected to the contact a in response to the control signal from the control signal generator 21, start address data STX and STY and data $\Delta X_H$, $\Delta Y_H$, $\Delta X_v$ and $\Delta Y_v$, which are received via the data bus 10, are supplied to a register 12. The start address data STX and STY indicate a start address where a read operation within a video memory 14 starts, that is, the start address of an image which is to be monitored. The data $\Delta X_H$ and $\Delta Y_H$ respectively indicate read rates in X and Y directions in the video memory 14 when a scan is made on the display screen in the horizontal direction for a minimum dot width to display an image. The data $\Delta X_v$ and $\Delta Y_v$ respectively indicate read rates in X and Y directions in the video memory 14 when a scan is made on the display screen in the vertical direction for a minimum dot width to display an image. Picture element data in memory elements of the video memory 14 are read in the X and Y directions when the scan is made on the display screen in the horizontal direction. An address is assigned to each memory element of the video memory 14.

After the start address data STX and STY and the data $\Delta X_H$, $\Delta Y_H$, $\Delta X_v$ and $\Delta Y_v$ are stored in the register 12, the multiplexer 11 is switched and connected to the contact b in response to the control signal from the control signal generator 21. As a result, the output of the full adder 13 is supplied to the multiplexer 11.

A video signal from a video signal generator 22 is supplied to the video memory 14 and picture element data of the video signal are stored at addresses determined by an X-coordinate in the horizontal direction and a Y-coordinate in the vertical direction, in response to a write control signal from the control signal generator 21. For example, the video signal generator 22 may be implemented as an image pickup device.

The register 12 comprises a storage part 12a for storing the start address data STX and STY, a storage part 12b for storing the data $\Delta X_H$ and $\Delta Y_H$, and a storage part 12c for storing the data $\Delta X_v$ and $\Delta Y_v$, and these six data are pre-stored in the register 12. The register 12 further comprises an A-port 12d for outputting a first output, a B-port 12e for outputting a second output, and storage parts 12f and 12g. The first and second outputs from the A-port 12d and the B-port 12e are supplied to the full adder 13. The full adder 13 adds the first and second outputs and supplies sum data to the register 12 via the contact b of the multiplexer 11. Hence, sum data $CX_H$, $CY_H$, $CX_v$, $CY_v$ and the like are stored in the storage parts 12f and 12g.

The A-port 12d is also connected to the video memory 14, and the video memory 14 receives the first output as an address signal. The stored picture element data are read out from the video memory 14 depending on this address signal in response to a read control signal from the control signal generator 21, and the read out picture element data are supplied to a display device 16 which is provided with a CRT, for example. The display device 16 displays the picture element data from the video memory 14 on the display screen in conformance with a known raster scan system such as an NTSC system. FIG. 3 shows a display screen 16A of the display device 16. In FIG. 3, a region other than positions A and B at the left of the display screen 16A corresponds to the actual display region.

In FIG. 2, a decoder 25 controls input and output of register 12, in response to a horizontal synchronizing signal HSYNC, a vertical synchronizing signal VSYNC, and a blanking signal or the like, labelled BLANKING ETC, of the video signal which is displayed on display device 16. The blanking signal indicates a blanking period of the video signal which is displayed on the display device 16.

More particularly, decoder 25 generates an input selection signal INPUT SELECT which is supplied to register 12. INPUT SELECT determines the one of storage parts 12a, 12b, 12c, 12f and 12g to which the input data from the multiplexer 11 is stored.

Furthermore, decoder 25 generates an A-port selection signal A-PORT SELECT which is supplied to register 12. A-PORT SELECT determines the one of storage parts 12a, 12b, 12c, 12f and 12g from which data to be output via A-PORT 12d is read.

Decoder 25 also generates a B-port selection signal B-PORT SELECT which is supplied to register 12. B-PORT SELECT determines the one of storage parts 12a, 12b, 12c, 12f and 12g from which the data to be output via B-PORT 12e is read.

Decoder 25 may take the form of a logic circuit or a look-up table (LUT), for example. In the latter case, decoder 25 generates the input selection signal, A-port selection signal and B-port selection signal, based on an embodiment described by a table shown in FIG. 4. In FIG. 4, the blanking signal is omitted for the sake of convenience, so as to simply the description.

CASE 1:

In FIG. 4, if both the vertical synchronizing signal and the horizontal synchronizing signal are active (that is, ON), a position A in FIG. 3 at the top left of the display screen 16A is determined. Position A corresponds to a time slot t1 in FIG. 5.

In FIG. 5:

(A) shows the vertical synchronizing signal, (B) shows the horizontal synchronizing signal, (C) shows the vertical synchronizing signal on an enlarged time scale, (D) shows the horizontal synchronizing signal on an enlarge time scale, and (E) shows time slots in which one of four kinds of output combinations are generated from the decoder 25.

In this case, the input selection signal causes $CX_v$ and $CY_v$ from multiplexer 11 to be stored in storage part 12g of register 12. In addition, the A-port selection signal causes STX and STY to be output to A-port 12d from storage part 12a of register 12. The B-port selection signal causes data "0" to be output to B-port 12e from register 12.

CASE 2:

In FIG. 4, if only the horizontal synchronizing signal is active (that is, ON), position B, at the left of the display screen 16A in FIG. 3 excluding the top left position A, is determined. Position B corresponds to a time slot t2 in FIG. 5.

In this case, the input selection signal causes $CX_v$ and CYv from multiplexer 11 to be stored in storage part 12g of register 12. In addition, the A-port selection signal causes $CX_v$ and $CY_v$ to be output to A-port 12d from storage part 12g of register 12. The B-port selection signal causes $\Delta X_v$ and $\Delta Y_v$ to be output to B-port 12e from storage part 12c of register 12.

CASE 3:

In FIG. 4, if the horizontal synchronizing signal becomes inactive (that is, OFF) after an active (ON) time, a position adjacent and to the right of position A or B of the display screen 16A in FIG. 3, is determined. This position adjacent and to the right of position A or B corresponds to a display time slot t3 shown in FIG. 5. That is, it corresponds to a picture element position at the start of the display of one (horizontal) line.

In this case, the input selection signal causes $CX_H$ and $CY_H$ from multiplexer 11 to be stored in storage part 12f of register 12. In addition, the A-port selection signal causes $CX_v$ and $CY_v$ to be output to A-port 12d from storage part 12g of register 12. The B-port selection signal causes $\Delta X_H$ and $\Delta Y_H$ to be output to B-port 12e from storage part 12b of register 12.

CASE 4:

In FIG. 4, a display position other than the left starting position of each line in FIG. 3 is determined for a case other than the cases 1, 2 and 3 above. This position, which does not fall under any of the cases 1, 2 and 3 above, corresponds to a display time slot t4 shown in FIG. 5.

In this case, the input selection signal causes $CX_H$ and $CY_H$ from multiplexer 11 to be stored in storage part 12f of register 12. In addition, the A-port selection signal causes $CX_H$ and $CY_H$ to be output to A-port 12d from storage part 12f of register 12. The B-port selection signal causes $\Delta X_H$ and $\Delta Y_H$ to be output to B-port 12e from storage part 12b of register 12.

In FIG. 4, the rightmost column shows the correspondence of each case with respect to a formula (A3) which will be described later in the specification.

The decoding process of the decoder 25 is of course not limited to that shown in FIG. 4. If $CX_v = STX$, $CY_v = STY$, $CX_H = CX_v$ and $CY_H = CY_v$ when both the vertical synchronizing signal and the horizontal synchronizing signal are active (ON) and $CX_v = CX_v + \Delta X_v$, $CY_v = CY_v + \Delta Y_v$, $CX_X = CX_v$ and $CY_X = CY_v$ when only the horizontal synchronizing signal is active (ON), the decoding timing of the decoder 25 may shift forward or backward with respect to the timing of the horizontal synchronizing signal or, $CX_v = CY_v$ and $CX_v = CX_v + \Delta X_H$ of the next process may be combined as $CX_H = CX_v + \Delta X_H$.

Of course, the decoder 25 may also be a part of the control circuit (not shown) which controls the general operation of the image processing apparatus. In this case, decoder 25 and control signal generator 21 form a part of this control circuit.

Figure 1:
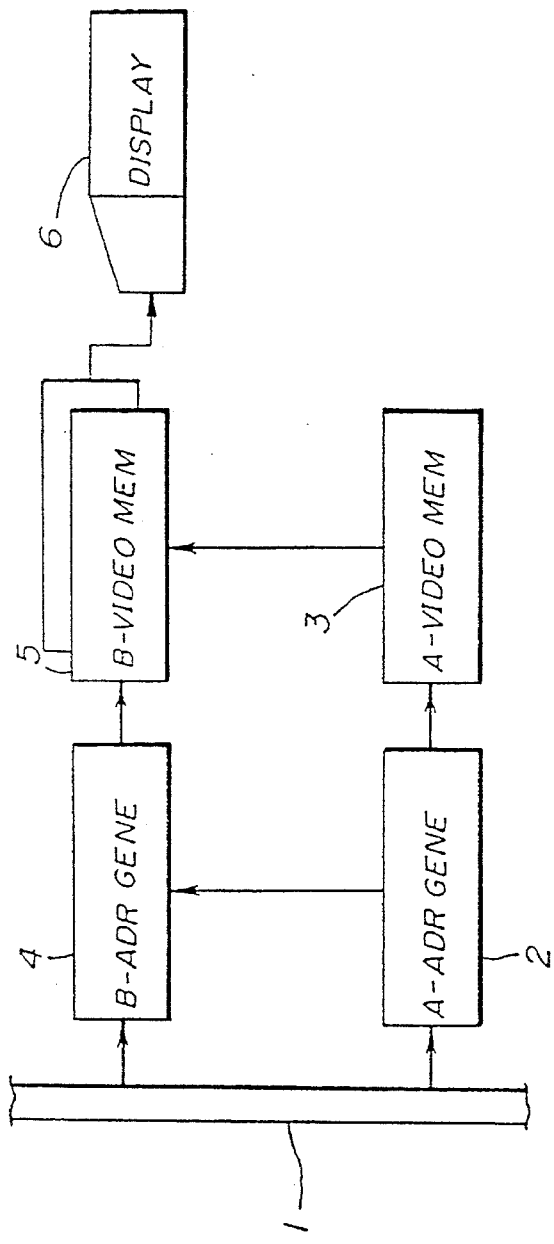
FIG. 1 is a system block diagram showing an essential part of a conventional image processing apparatus.
Figure 6B:
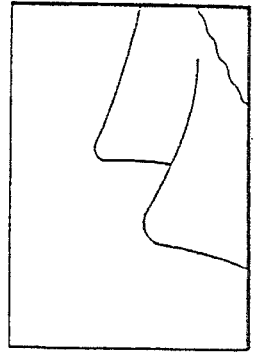
FIGS. 6A and 6B respectively are diagrams for explaining a read operation within a video memory of the image processing apparatus shown in FIG. 2.

For the sake of convenience, it is assumed that the picture element data stored in the video memory 14 describes an image 15 shown in FIG. 6A and that an image processing such as a rotating process is made with respect to a portion (hereinafter referred to as an image portion) 15a of the image 15, so as to display an image shown in FIG. 6B.

Figure 6A:
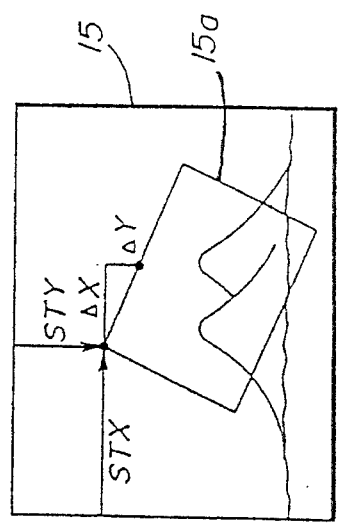

When both the vertical synchronizing signal and the horizontal synchronizing signal supplied to the decoder 25 are active (ON), that is, when determining a top left position of the image portion 15a shown in FIG. 6A, the register 12 supplies the start address data STX and STY which are coordinates of the top left of the image portion 15a from the storage part 12a to the full adder 13 via the A-port 12d. In addition, the register 12 supplies the data $\Delta X_v$ and $\Delta Y_v$ from the storage part 12c to the full adder 13 via the B-port 12e. For example, $\Delta X_v$ is "−1" and $\Delta Y_v$ is "−3" in FIG. 7.

Figures 8, 9, 10:
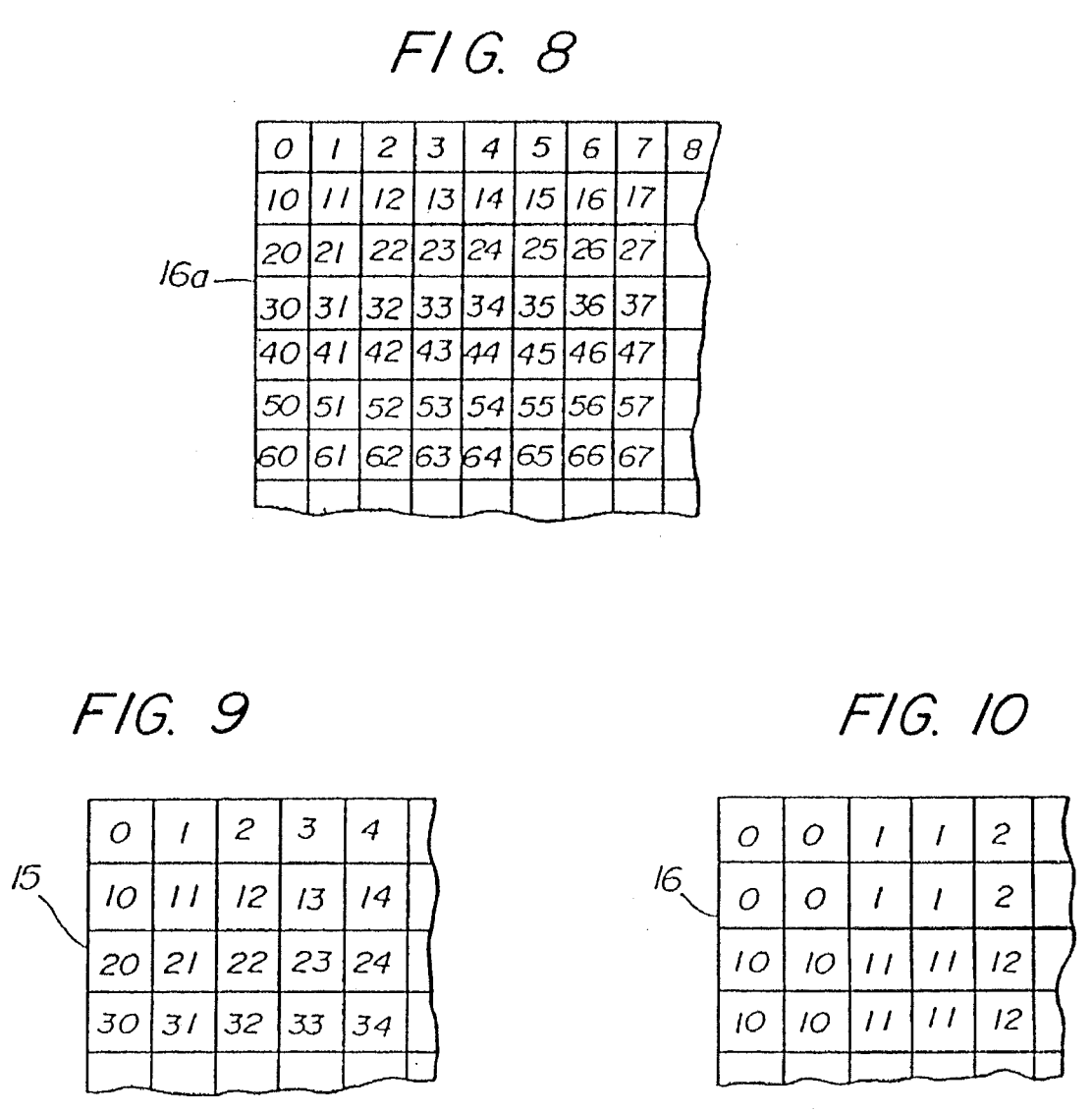

The full adder 13 carries out additions $STX + \Delta X_v$ and $STY + \Delta Y_v$ based on the first and second outputs of the register 12, and the sum data $CX_v$ and $CY_v$ are supplied to the storage part 12g of the register 12 via the contact b of the multiplexer 11. On the other hand, the start address data STX and STY are supplied from the register 12 to the video memory 14 via the A-port 12d as the address signal. For example, a picture element data "0" shown in FIG. 7 which corresponds to the received address signal is read out from the video memory 14 and supplied to the display device 16. The display device 16 scans the picture element data which is supplied in synchronism with the horizontal and vertical synchronizing signals from the top left of the display screen, and the picture element data indicated by "0" is displayed at the top left corner of a display screen 16a of the display device 16 as shown in FIG. 8. FIG. 8 shows the display positions of the picture element data stored in the video memory 14 on the display screen 16a.

Figure 7:
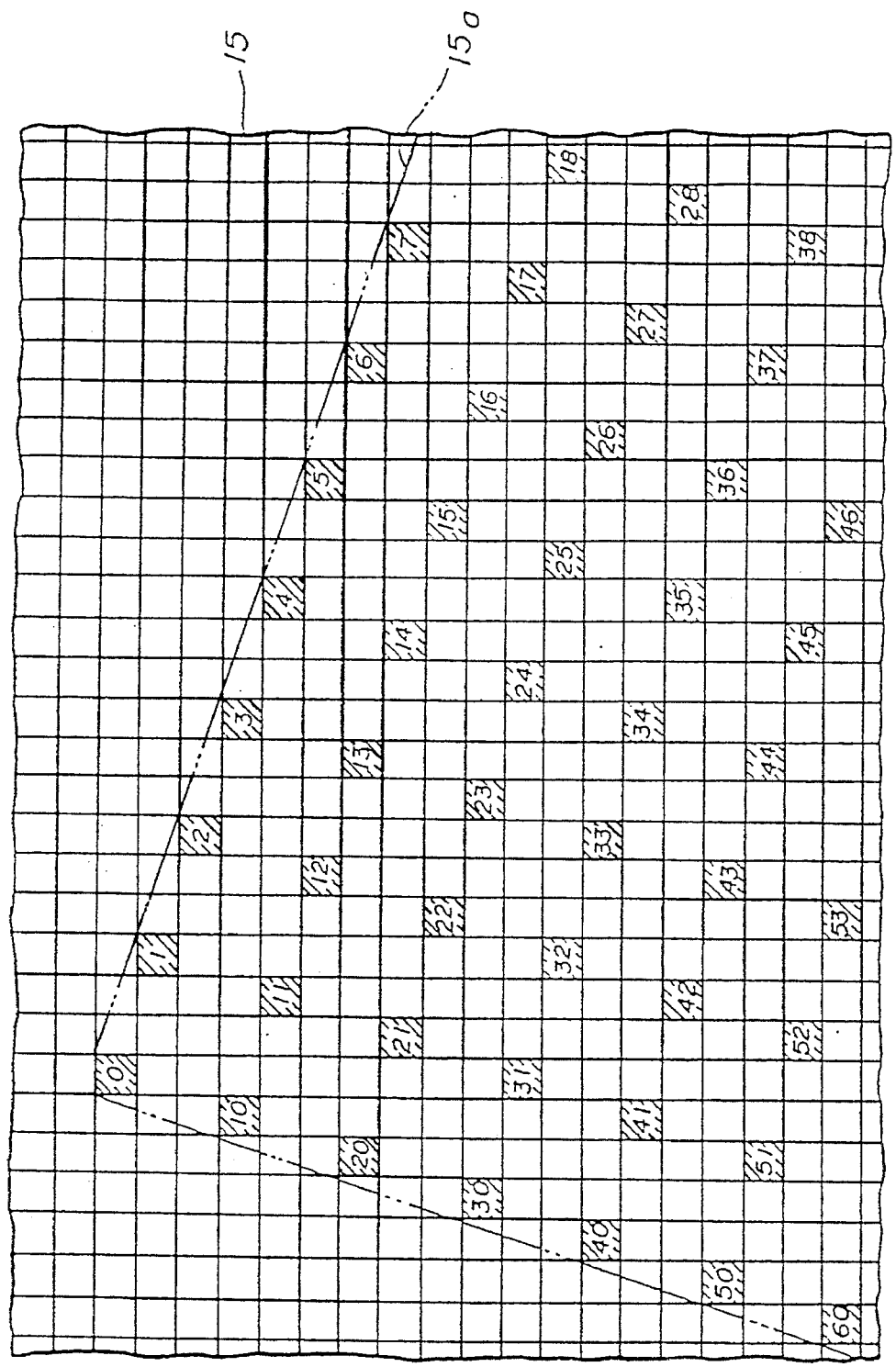
FIG. 7 is a diagram for explaining the read operation in more detail.

Next, the register 12 supplies the data $CX_v$ and $CY_v$ from the storage part 12g to the full adder 13 via the A-port 12d. In addition, the register 12 supplies $\Delta X_H$ and $\Delta Y_H$ from the storage part 12b to the full adder 13 via the B-port 12e. For example, $\Delta X_H$ is "3" and $\Delta Y_H$ is "−1" in FIG. 7. The full adder 13 carries out additions $CX_v+\Delta X_H$ and $CY_v+\Delta Y_H$ based on the first and second outputs of the register 12, and the sum data $CX_H$ and $CY_H$ are supplied to the storage part 12f of the register 12 via the contact b of the multiplexer 11. On the other hand, the data $CX_v$ and $CY_v$ are supplied from the register 12 to the video memory 14 via the A-port 12d as the address signal. Hence, the data indicated by "10" in FIG. 7 is displayed at the leftmost position in the second row of the display screen 16a as shown in FIG. 8.

Then, the register 12 supplies the data $CX_H$ and $CY_H$ from the storage part 12f to the full adder 13 via the A-port 12d. In addition, the register 12 supplies $\Delta X_H$ and $\Delta Y_H$ from the storage part 12b to the full adder 13 via the B-port 12e. The full adder 13 carries out additions $CX_H+\Delta X_H$ and $CY_H+\Delta Y_H$ based on the first and second outputs of the register 12, and the sum data $CX_H$ and $CY_H$ are supplied to the storage part 12f of the register 12 via the contact b of the multiplexer 11. On the other hand, the data $CX_H$ and $CY_H$ are supplied from the register 12 to the video memory 14 via the A-port 12d as the address signal. Hence, the data indicated by "11" in FIG. 7 is displayed at the second leftmost position in the second row of the display screen 16a as shown in FIG. 8.

Similarly thereafter, every time the scan on the display screen 16a progresses by one dot, the increases of the data $CX_H$ and $CY_H$ are added to the calculated values previously output from the full adder 13, and this operation is successively carried out for one line on the display screen 16a.

On the other hand, when only the horizontal synchronizing signal supplied to the decoder 25 is active (ON), the register 12 supplies the data $CX_v$ and $CY_v$ from the storage part 12g to the full adder 13 via the A-port 12d. In addition, the register 12 supplies the data $\Delta X_v$ and $\Delta Y_v$ from the storage part 12c to the full adder 13 via the B-port 12e. For example, $\Delta X_v$ is "−1" and $\Delta Y_v$ is "−3" in FIG. 7. Therefore, the full adder 13 carries out additions $CX_v+\Delta X_v$ and $CY_v+\Delta Y_v$ based on the first and second outputs of the register 12, and the sum data $CX_v$ and $CY_v$ are supplied to the storage part 12g of the register 12 via the contact b of the multiplexer 11. On the other hand, the data $CX_v$ and $CY_v$ are supplied from the register 12 to the video memory 14 via the A-port 12d as the address signal. Hence, the picture element data is read out from the video memory 14 and is displayed on the display screen 16a of the display device 16 as shown in FIG. 8.

Next, the register 12 supplies the data $CX_v$ and $CY_v$ from the storage part 12g to the full adder 13 via the A-port 12d. In addition, the register 12 supplies $\Delta X_H$ and $\Delta Y_H$ from the storage part 12b to the full adder 13 via the B-port 12e. For example, $\Delta X_H$ is "3" and $\Delta Y_H$ is "−1" in FIG. 7. The full adder 13 carries out additions $CX_v+\Delta X_v$ and $CY_v+\Delta Y_H$ based on the first and second outputs of the register 12, and the sum data $CX_H$ and $CY_X$ are supplied to the storage part 12f of the register 12 via the contact b of the multiplexer 11. On the other hand, the data $CX_v$ and $CY_v$ are supplied from the register 12 to the video memory 14 via the A-port 12d as the address signal. Hence, the data read out from the video memory 14 is displayed on the right of the previously displayed data on the display screen 16a.

Then, register 12 supplies the data $CX_H$ and $CY_H$ from the storage part 12f to the full adder 13 via the A-port 12d. In addition, register 12 supplies $\Delta X_H$ and $\Delta Y_H$ from the storage part 12b to the full adder 13 via the B-port 12e. Full adder 13 carries out additions $CX_H+\Delta X_X$ and $CY_H+\Delta Y_H$ based on the first and second outputs of the register 12, and sum data $CX_H$ and $CY_H$ are supplied to the storage part 12f of register 12 via the contact b of multiplexer 11. On the other hand, $CX_H$ and $CY_H$ are supplied from register 12 to the video memory 14 via the A-port 12d as the address signal. Hence, the picture element data read out from the video memory 14 is displayed on the right of the previously displayed data on the display screen 16a of the display device 16 as shown in FIG. 8.

Similarly thereafter, every time the scan on the display screen 16a progresses by one dot, the increases of the data $CX_H$ and $CY_H$ are added to the calculated values previously output from full adder 13, and this operation is successively carried out for one line on display screen 16a.

When carrying out the rotating process, for example, the picture element data stored in the memory elements which are arranged in a matrix arrangement in the video memory 14 which stores the video signal (picture element data) are read in an oblique direction, and the picture element data which are read out by this oblique read operation are displayed on the display screen 16a of the display device 16 in synchronism with the horizontal and vertical synchronizing signals as shown in FIG. 8. Therefore, the image which is displayed on the display screen 16a is rotated from the original image as may be seen from FIG. 6A.

When carrying out the enlarging process, the data $\Delta X_H$, $\Delta Y_H$, $\Delta X_v$ and $\Delta Y_v$ may be set as follows, for example.

$\Delta X_H=0.5$ $\Delta Y_H=0$ $\Delta X_v=0$ $\Delta Y_v=0.5$

In this case, the picture element data stored in one memory element of the video memory 14 is read when the horizontal scan and the vertical scan respectively progress for two dots on the display screen 16a. The picture element data stored in the memory element number "0" within video memory 14 as shown in FIG. 9 is enlarged to two times and displayed on display screen 16a as shown in FIG. 10. Thereafter, the picture element data stored in video memory 14 is enlarged and displayed on display screen 16a by similarly reading the picture element data from video memory 14. FIG. 9 shows the arrangement of the picture element data stored in video memory 14, and FIG. 10 shows the picture element data displayed on display screen 16a when the picture element data shown in FIG. 9 are subjected to the enlarging process.

On the other hand, the picture element data stored in video memory 14 may be reduced and displayed on display screen 16a by setting the data $\Delta X_H$, $\Delta Y_H$, $\Delta X_v$ and $\Delta Y_v$ to values greater than one.

Furthermore, by appropriately setting the values of the data $\Delta X_H$, $\Delta Y_H$, $\Delta X_v$ and $\Delta Y_v$, it is possible to tilt the image stored in the video memory 14 in the horizontal or vertical direction on the display screen 16a, and the so-called "scrolling" can also be performed.

Unlike the conventional image processing apparatus, this embodiment does not require a video memory for storing video information which has been subjected to image processing operations such as a rotating process. For this reason, it is possible to considerably shorten the time it takes to display the processed image on a display device. In addition, it is unnecessary to provide a multiplier for performing multiplication such as that of the set of formulas (1) described above, and the necessary operations can be carried out at a high speed by use of an image processing apparatus which has a relatively small scale.

In FIG. 2, the number of bits of the data supplied from the A-port 12d of the register 12 to the video memory 14 may be equal to or different from the number of bits of the data supplied from the A-port 12d to the full adder 13.

In this embodiment, the processed video information is displayed on the display device 16 which is used as an output means. However, it is of course possible to employ a printer as the output means in place of the display device 16.

The invention provides for conversion of a first order mapping Formula (A1) into a recurrence Formula (A2), and for transforming Formula (A2) into a Formula (A3) by taking into account:

(i) the characteristic of the raster scan display,
(ii) the simplicity of the circuit,
(iii) the ease with which the parameters may be set, and
(iv) the degree of freedom of description of the display.

In particular, the formulas (A1), (A2) and (A3) are as follows:

$$\left. \begin{array}{l} X = x_0 + A\cos\theta \cdot h - A\sin\theta \cdot v \\ Y = y_0 + A\sin\theta \cdot h + A\cos\theta \cdot v \end{array} \right\} \quad (A1)$$

where
X and Y denote coordinates on the memory,
h and v denote coordinates on the display screen,
A denotes reduction factor,
θ denotes rotation angle, and
$x_0$ and $y_0$ denote the amount of a parallel movement.

$$\left. \begin{array}{l} X_0 = x_0 \quad X_n = X_{n-1} + A\cos\theta \cdot \Delta v - A\sin\theta \cdot h \\ Y_0 = y_0 \quad Y_n = Y_{n-1} + A\sin\theta \cdot \Delta v + A\cos\theta \cdot h \end{array} \right\} \quad (A2)$$

where n=1, 2, ...
Finally, $$\left. \begin{array}{ll} X_0 = X'_0 = x_0 & \\ X_n = X'_n = X_{n-1} + \Delta X_v & \text{when } v \text{ changes} \\ X_n = X_n + \Delta X_h & \text{when } h \text{ changes} \\ Y_0 = Y'_0 = y_0 & \\ Y_n = Y'_n = Y_{n-1} + \Delta Y_v & \text{when } v \text{ changes} \\ Y_n = Y_n + \Delta Y_h & \text{when } h \text{ changes} \end{array} \right\} \quad (A3)$$

Figure 11:
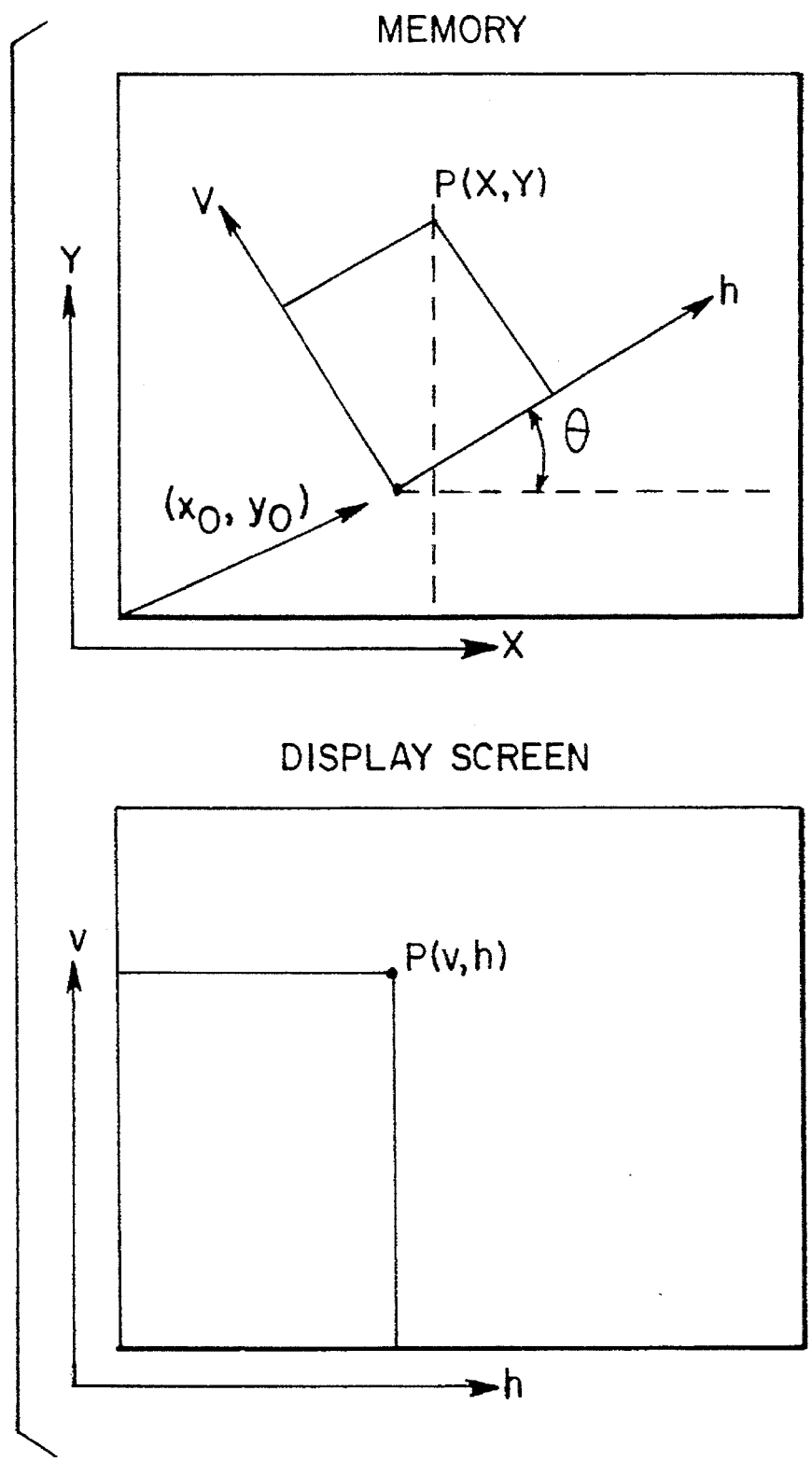
FIG. 11 is a diagram of Memory and of a corresponding Display Screen useful for explaining operation of a preferred embodiment of the present invention.

Charts of Memory and of a corresponding Display Screen are shown in FIG. 11.

In Formula (A3),
$X_n$, $X'_n$, $x_o$, $\Delta X_v$, $\Delta X_h$, $Y_n$, $Y'_n$, $Y_0$, $\Delta Y_v$ and $\Delta Y_h$ respectively correspond to the registers:
$CRX_H$, $CRX_v$, STX, $\Delta X_v$, $\Delta X_H$, $CRY_H$, $CRY_v$, STY, $\Delta Y_v$ and $\Delta Y_H$.

Significantly, the present invention provides that Formula (A3) is carried out by a circuit. That is, a circuit implements Formula (A3). According to the present invention, $x_0$, $y_0$, $\Delta X_v$, $\Delta Y_v$, $\Delta X_h$, and $\Delta Y_h$ are each independent variables. In other words, $x_0$, $Y_0$, $\Delta X_v$, $\Delta Y_v$, $\Delta X_h$, and $\Delta Y_n$ are not necessarily a function of the reduction factor A and the rotation angle θ. As a result, the present invention is able to provide displays with large degrees of freedom, such as those providing scrolling and slopes.

Thus, the invention thus provides an image processing apparatus having a memory having memory elements for storing picture element data of a video information which describes an original image, each of the memory elements having an address assigned thereto, as well as an operation part for receiving a start address where a read operation is to start within the memory and predetermined data indicative of a difference between the start address and a next address where the read operation is to be made and for calculating the next address from the start address data and the predetermined data. The image processing apparatus also has a reading part coupled to the memory and the operation part for reading the picture element data which is stored in the memory at the next address calculated by the operation part. The image processing apparatus also has an output part for outputting the picture element data read by the reading part, the picture element data output describing at least a portion of the original image subjected to a predetermined image processing. In the image processing apparatus, the start address includes a start address STX in a direction X and a start address STY in a direction Y. The predetermined data includes (1) a datum which indicates a difference between the start address data STX and a next address in the direction X when a scan is made on the display in a horizontal direction for the first minimum unit width; (2) a datum $\Delta Y_H$ which indicates a difference between the start address data STY and a next address in the direction Y when a scan is made on the display in the horizontal direction of the first minimum unit width; (3) a datum $\Delta X_v$ which indicates a difference between the start address data STX and a next address in the direction X when a scan is made on the display in a vertical direction for a second minimum unit width; and (4) a datum $\Delta Y_v$ which indicates a difference between the start address data STY and a next address in the direction Y when a scan is made on the display in the vertical direction for the second minimum unit width. Also, the operation part includes (1) a register for storing STX, STY, $\Delta X_H$, $\Delta Y_H$, $\Delta X_v$ and $\Delta Y_v$; (2) a register for storing sum data $CX_v$, $CY_v$, $CX_H$ and $CY_H$ wherein $CX_H$ and $CY_X$ in the register indicate the read address of the memory; and (3) an adder for adding the data received from the register and for supplying the sum data. The adder adds the data $\Delta X_H$ to $CX_H$ and $\Delta Y_H$ to $CY_H$ by every horizontal unit proceeding and adding the data $\Delta X_v$ to $CX_v$ and $\Delta Y_v$ to $CY_v$ to load the data from $CX_v$ to $CX_H$ and from $CY_v$ to $CY_H$ by every vertical unit proceeding. Here, H and V indicate coordinate axes on the display, and X and Y represent coordinate axes in the memory.

Further, the present invention is not limited to these embodiments, but various variations and modifications may be made by those skilled in the art without departing from the scope of the present invention. It is therefore to be understood that, within the scope of the appended claims and their equivalents, the invention may be practiced otherwise than as specifically described.

What is claimed is:

1. An image processing apparatus, comprising:

a) memory means for storing a video signal at addresses determined by an address signal;

b) first control means, coupled to the memory means, for controlling write and read operations of the memory means;

c) display means, coupled to the memory means, the display means including a display screen for displaying the video signal read from the memory means by making successive horizontal scans in a vertical direction based on synchronizing signals;

d) register means including:
   1) a first storage part for storing a start address datum which indicates a start address STX in a direction X and a start address STY in a direction Y where a read operation from the memory means starts;
   2) a second storage part for storing a read rate datum which indicates a difference $\Delta X_H$ between the start address STX and a next address in the direction X and a difference $\Delta Y_H$ between the start address STY and a next address in the direction Y when a scan is made on the display screen of the display means in a horizontal direction for a first minimum unit width;
   3) a third storage part for storing a read rate datum which indicates a difference $\Delta X_v$ between the start address STX and a next address in the direction X and a difference $\Delta Y_v$ between the start address STY and a next address in the direction Y when a scan is made on the display screen of the display means in the vertical direction for a second minimum unit width; and
   4) fourth and fifth storage parts for storing sum data $CX_H$, $CY_H$, $CX_v$ and $CY_v$;

e) a single adder means, coupled to the register means, for adding first and second outputs of the register means and for outputting sum data;

f) multiplexer means, having at least a first input, the multiplexer means being coupled to the register means and the adder means, for feeding back the sum data from the adder means to the register means via the first input of the multiplexer means, the second output of the register means being supplied to the memory means as the address signal; and g) second control means, coupled to the register means, for controlling input and output of the register means by selection signals generated based on the synchronizing signals;

wherein:
   A) the selection signals determine the one of the first through fifth storage parts to which the fed back sum data from the adder means are stored via the multiplexer means; and
   B) the selection signals determine the two of the first through fifth storage parts from which the data are to be supplied to the adder means as the first and second outputs;

so that the display means displays an image subjected to a predetermined process relative to an original image of the video signal, the predetermined process being selected from a group consisting of enlarging, reducing, rotating and scrolling.

2. The image processing apparatus of claim 1, wherein:
   the first control means includes means for controlling inputs of the multiplexer means so that:
   1) the data are initially pre-stored in the first through third storage parts of the register means via a second input of the multiplexer means; and
   2) the sum data from the adder means are thereafter input to the register means via the first input of the multiplexer means.

3. The image processing apparatus of claim 1, wherein:
   the second control means includes means for controlling input and output of the register means so that:
   1) $CX_v$=STX, $CY_v$=STY, $CX_H$=$CX_v$ and $CY_H$=$CY_v$ when both vertical and horizontal synchronizing signals are active; and
   2) $CX_v$=$CX_v$+$\Delta Xv$, $CY_v$=$CY_v$+$\Delta Y_v$, $CX_H$=$CX_v$ and $CY_H$=$CY_v$
   when only the horizontal synchronizing signal is active.

* * * * *